No. 761,444.

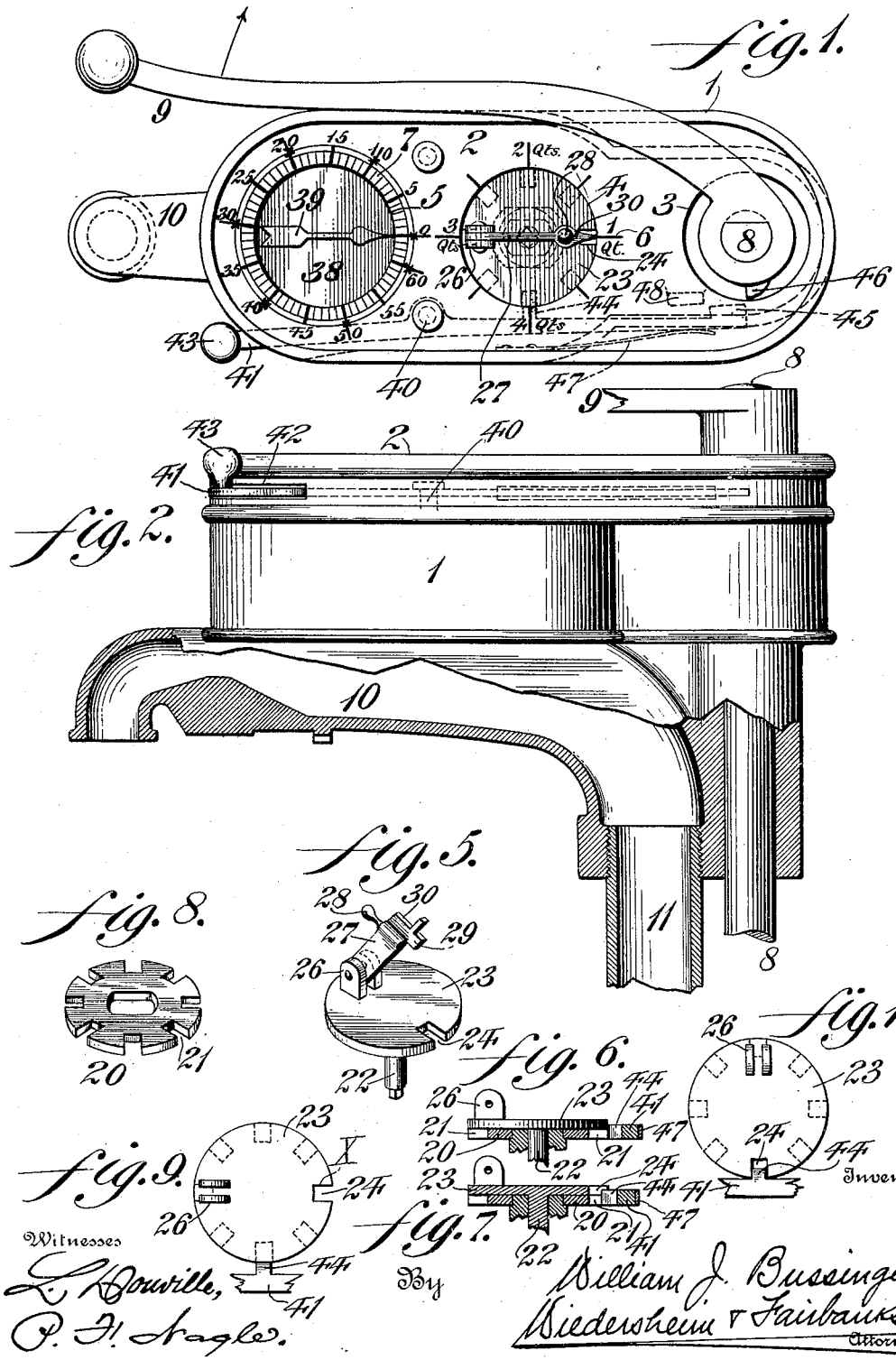

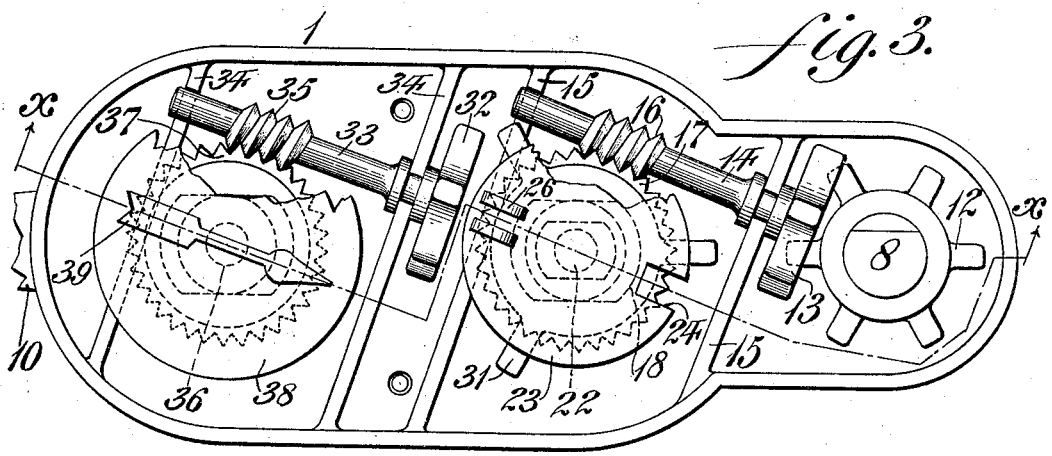
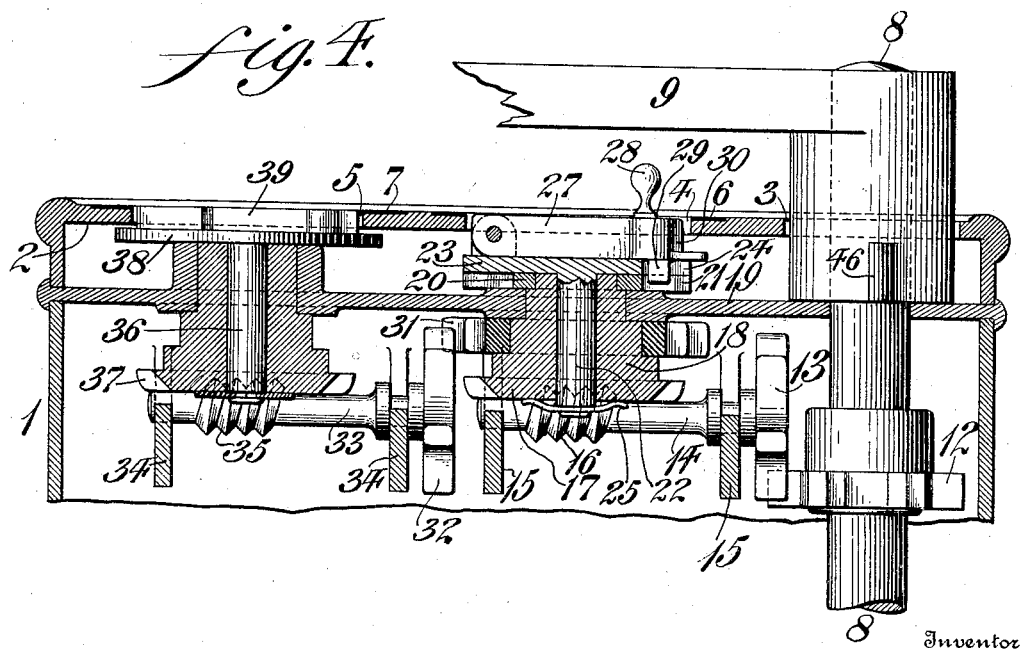

Patented May 31, 1904.

UNITED STATES PATENT OFFICE.

WILLIAM J. BUSSINGER, OF PHILADELPHIA, PENNSYLVANIA, ASSIGNOR TO NATIONAL SPECIALTY MANUFACTURING COMPANY, OF PHILADELPHIA, PENNSYLVANIA, A FIRM.

MEASURING DEVICE FOR PUMPS.

SPECIFICATION forming part of Letters Patent No. 761,444, dated May 31, 1904.

Application filed May 25, 1903. Serial No. 158,602. (No model.)

*To all whom it may concern:*

Be it known that I, WILLIAM J. BUSSINGER, a citizen of the United States, residing in the city and county of Philadelphia, State of Pennsylvania, have invented a new and useful Improvement in Measuring Devices for Pumps, of which the following is a specification.

My invention relates to an attachment to a pump adapted to raise molasses or other liquids from barrels or like receptacles.

It consists of means for measuring and recording the quantity of liquid raised and for preventing excessive delivery of such liquid.

It further consists of novel details of construction, all as will be hereinafter set forth.

Figure 1 represents a top plan view of a measuring device embodying my invention. Fig. 2 represents a partial side elevation and partial vertical section of the same. Fig. 3 represents my device in top plan view, portions of the casing being removed. Fig. 4 represents a section on the line *x x*, Fig. 3, Figs. 3 and 4 being on an enlarged scale. Figs. 5 to 10 represent detached portions of the device.

Similar numerals of reference indicate corresponding parts in the figures.

Referring to the drawings, 1 designates a casing, of which the top 2 has apertures 3, 4, and 5. Imprinted or cast on the top 2 adjacent the openings 4 and 5 are scales 6 and 7, the function of which will appear. Passing freely through the aperture 3, which extends down through the casing 1, is a rod 8, having at its upper end a crank-handle 9. Affixed to the lower side of the casing 1 is a spout 10, from which depends a pump-tube 11. It will be understood that the rod 8 and tube 11 pass down to the bottom of a barrel and there connect with a rotary or like pump adapted to deliver a given volume of liquid through the spout 10 at each rotation of the rod 8. As the pump *per se* forms no part of the present invention, I have not deemed it necessary to show or further describe it. On the rod 8 is fixed a gear 12, meshing with a gear 13 on a horizontal shaft 14, mounted in brackets 15 within the casing 1.

A worm 16 on the shaft 14 engages with the beveled gear 17, mounted on a tubular shaft 18, which finds bearing in the plate 19 in the casing 1. Fixed on the shaft 18 above the plate 19 is a disk 20, having peripheral notches 21, shown as eight in number. A shaft 22 passes through the tubular shaft 18 and bears at its upper end a disk 23, notched at 24. A spring 25 at the foot of the shaft 22 and bearing against the foot of the hollow shaft 18 holds the disks 20 and 22 in frictional contact. Pivoted in lugs 26 on the disk 23 is an index-lever 27, provided with a knob or handle 28, a depending dog or lug 29, and a tip or pointer 30. Also fixed on the shaft 18 is a pinion 31, meshing with a pinion 32 on a shaft 33, carried in bearings 34 and having a worm 35, these last four parts being similar to the parts 13, 14, 15, and 16, before described.

On a vertical shaft 36 is a beveled gear 37, meshing with the worm 35. The shaft 36 bears at its upper end above the plate 19 a disk 38, on the upper surface of which is a fixed finger 39. Pivoted at 40 in the upper part of the casing 1 is a lever 41, one end of which projects through the apertures 42 in the case 1 and may have a button 43. On the lever 41 is a lug 44, adapted to engage in the notches 21 and 24 of the disks 20 and 23. A second lug 45 on the lever engages with a dog 46 on the crank-handle 9. A spring 47 acts to normally hold the lugs 44 and 45 in operative position and the lever 41 itself pressed against a stop 48.

The operation is as follows: We will assume that the capacity of the pump to which the tube 11 and actuating-rod 8 are connected to be one gill per stroke or rotation of the rod, and this without regard to ullage. If it is desired to draw one quart of the liquid from the tank or other reservoir, the operator first sets the index as shown in Figs. 1, 4, and 9 of the drawings. As the gear 17 has thirty-two teeth, it is evident that the fourth rotation of the rod 8 will have delivered one pint through the spout 10 and will have advanced the disks 20 and 23, locked together by the dog 29, so that the notch marked X, Fig. 9, is brought opposite the lug 44 of the lever 41. As, however, the lug 44 can only enter when the single notch 24 of the upper disk 23 coincides in position with one of the notches 21 of the disk 20, (vide Fig. 6,) the rotation of the rod may be continued until a second pint has been delivered. Then the lug 44 will slip into the notches in both disks, as shown in Figs. 7 and 10. The index 27 then indicates one quart on the scale 6. At the same time the lug 45 has entered the path of the dog 46, which prevents the further rotation of the rod 8.

It is evident that to draw any number of pints up to one gallon it is only requisite to withdraw the lug 44 by pressing the button 43 on the lever 41 and rotating the disk 23 until the index 27 indicates the desired quantity. To deliver more than a gallon, it is necessary to again disengage the lugs 44 and 45 after the disks have made each one complete rotation, which is registered on the scale 7 by the index 39.

It is further evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In a measuring device, a pump-actuating rod, a rotary disk operatively connected therewith, recesses in said disk, a lug adapted to engage with said recesses and means secured within said device and connected with said lug for preventing the further rotation of said rod after the delivery of a predetermined quantity.

2. In a measuring device, a pump-actuating rod, a rotary disk operatively connected therewith, recesses in said disk, a second recessed disk adjacent said first-named disk, means for causing the recesses in said disk to coincide, a lug adapted to enter such coincident recesses and means connected with said lugs for preventing the further rotation of said rod after the delivery of a predetermined quantity.

3. In a measuring device, a pump-actuating rod, a rotary disk operatively connected with said rod and a registering-disk operatively connected with said first-named disk and adjustable thereon.

4. In a measuring device, a pump-actuating rod, a rotary disk operatively connected with said rod, a registering-disk frictionally connected with said first-named disk and a second registering-disk positively connected to said first-named disk.

5. In a measuring device for pumps, pump-actuating means, means for stopping said actuating means, adjustable means permitting the operation of said stopping means at any of a plurality of numbers of strokes of the pump and manually-operative means for releasing said stopping means and thereby allowing an invariable additional number of strokes to be given to the pump.

6. In a measuring device for pumps, a pump-actuating rod, means for stopping said rod, adjustable means for permitting the operation of said stopping means at any of a plurality of numbers of movements of said rod and manually-operative means for releasing said stopping means and thereby allowing an invariable additional number of movements to be given to said rod.

7. In a measuring device for pumps, a casing, a pump-actuating rod, means in said casing and engageable with said rod for stopping the same, adjustable means for permitting the operation of said stopping means at any of a plurality of movements of said rod and manually-operative means allowing an invariable additional number of movements to be given to said rod.

8. In a measuring device for pumps, pump-actuating means, means for stopping said actuating means, means for permitting the operation of said stopping means at any of a plurality of numbers of strokes of the pump, means for indicating the quantity of liquid delivered by the pump when stopped, manually-operative means for releasing said stopping means whereby an invariable additional number of strokes may be given to the pump and means for indicating the additional quantity of liquid delivered by reason of said additional number of strokes.

9. In a measuring device for pumps, pump-actuating means, means for stopping said actuating means, adjustable means for permitting the operation of said stopping means at any of a plurality of numbers of strokes of the pump, means for indicating the quantity of liquid delivered by the pump when stopped, manually-operative means for releasing said stopping means whereby an invariable additional number of strokes may be given to the pump and means for indicating the total quantity of liquid delivered by the pump at a plurality of successive operations.

10. In a measuring device for pumps, pump-actuating means, means for stopping said actuating means, adjustable means for permitting the operation of said stopping means at any of a plurality of numbers of strokes of the pump, a scale, means manually movable from a fixed point thereon and automatically returnable thereto for indicating the quantity of liquid delivered by the pump when stopped and manually-operative means for releasing said stopping means whereby an invariable additional number of strokes may be given to the pump.

WILLIAM J. BUSSINGER.

Witnesses:
JOHN A. WIEDERSHEIM,
C. D. McVAY.